United States Patent [19]

Ahola et al.

[11] Patent Number: 5,556,560
[45] Date of Patent: Sep. 17, 1996

[54] WELDING ASSEMBLY FOR FEEDING POWDERED FILLER MATERIAL INTO A TORCH

[75] Inventors: Tom Ahola; Kari Ahola, both of Klaukkala, Finland

[73] Assignee: Plasma Modules Oy, Helsinki, Finland

[21] Appl. No.: 307,825

[22] PCT Filed: Mar. 22, 1993

[86] PCT No.: PCT/FI93/00109

§ 371 Date: Sep. 28, 1994

§ 102(e) Date: Sep. 28, 1994

[87] PCT Pub. No.: WO93/19882

PCT Pub. Date: Oct. 14, 1993

[30] Foreign Application Priority Data

Mar. 31, 1992 [FI] Finland ............................. U 920268

[51] Int. Cl.⁶ ...................................................... B23K 10/00
[52] U.S. Cl. ............................. 219/121.45; 219/121.47; 219/121.51; 219/76.16
[58] Field of Search ...................... 219/121.47, 76.14, 219/76.15, 76.16, 121.51, 121.48, 121.59, 121.5

[56] References Cited

U.S. PATENT DOCUMENTS 3,071,678   1/1993   Neely et al. ........................ 219/75
3,591,759   7/1971   Stand ................................. 219/75
4,389,559   6/1983   Rotolico et al. ................... 219/121.47
4,627,990   12/1986  Saga et al. ........................ 427/10
4,672,171   6/1987   Cusimano et al. ................. 219/121 AM
5,043,548   8/1991   Whitney et al. ................... 219/121.47

FOREIGN PATENT DOCUMENTS 2227699A   8/1990   United Kingdom.

Primary Examiner—Mark H. Paschall
Attorney, Agent, or Firm—Hoffmann & Baron

[57] ABSTRACT

An assembly suited for feeding a powderized filler material in plasma welding. The invention is based on feeding the filler material flow first along a first channel, which is next divided into two separate channels that are branched aside from the first channel. The forked branches can further be divided into a plurality of branches, and according to an advantageous embodiment, the manifold of feed channels exits into a feed nozzle of shielding gas and powderized filler material. The nozzle is provided with a plurality of grooves along which the gas and powderized filler material enter the welding plasma of the torch, and the gas flow becomes laminarized. The shielding gas and the filler material can be fed along a single manifold of channels and the tip of the torch can be made extremely small in size.

33 Claims, 5 Drawing Sheets

WELDING ASSEMBLY FOR FEEDING POWDERED FILLER MATERIAL INTO A TORCH

The present invention is related to a powderized filler material feed assembly according to the preamble of claim 1 particularly suited to plasma and laser welding.

Use of powderized filler material in mechanized welding is well known in the art. Powderized filler material is conventionally added during the welding of wide-gap downhand welds in horizontal position as well as in plasma spray coating. In the welding of joints the added powderized filler is similar to the parent materials to be joined, while in plasma spray coating the powderized filler materials can be varied widely according to the coating desired. A powderized filler material is particularly advantageously employed in plasma and laser welding.

In prior-art embodiments the dosing of the powderized filler material is typically arranged so that a stripe of the powderized filler material is applied via a nozzle orifice at the bottom of powderized material container onto a moving support such as a roller or band. The dosed powderized material is transferred from the support surface by gravity or compressed gas into a transport system that conveys the powderized filler material to the weld pool. The transport system conventionally is a mere pipe opening in the vicinity of the plasma arc so that the powderized filler material fed via the pipe is directed into the plasma. Occasionally the powderized material tends to clog the feed line, whereby a pulsating feed of the powderized material stream results. A constant feed rate of the powderized material stream has been attempted by means of a small-diameter feed line combined with high flow speed.

In a plasma torch the main arc used for welding is excited between the center electrode of the torch and the work piece. The nozzle part of the torch comprises two coaxially situated chambers. The inner chamber houses a centered tungsten electrode and the chamber is provided with an orifice aligned at the electrode tip. The orifice gas to be ionized into a plasma is fed into this chamber. The inner chamber is coaxially enclosed by a second chamber having an annular exit slot surrounding the nozzle of the inner chamber. This outer chamber is fed with a shielding gas whose exit flow protects the main arc. Obviously, the feed of the powderized filler material into the arc of the plasma torch is difficult. The plasma arc in itself causes a relatively strong blast which repels the powderized material, and moreover, the arc is surrounded by a shielding gas envelope through which the powderized material must be projected into the main arc. If large amounts of powderized material can be used, the mass of the powderized material flow is substantial, whereby its penetration capability into the plasma arc is also improved. Typically, however, the feed nozzle orifice of the powderized material dosing device in high-capacity torches is located relatively far from the arc, whereby a portion of the filler material cannot reach the correct target point, but instead, is lost outside the molten pool. Moreover, the long distance between the nozzle orifice and the intended target allows the jet of powderized material to spread resulting in a fanned shape of the jet. The spreading angle,is further widened by the distributed velocity profile of the jet particles. For large mass rates of filler material, the proportion of stray stream relative to the total mass rate is not decisive, whereby small changes in the stray stream cause no greater error in the actual filler material quantity reaching the main arc. At low mass rates, in the order of a few grams per hour, variations in the proportion of the stray stream of filler material can easily cause high deviations in the actual mass rate of applied filler material, thus necessitating accurate aiming of the filler material into the plasma arc.

Conventional methods of filler material feed in the form of a wire or stick, whether in mechanized or manual welding, cannot fully replace the use of powderized filler material. When a very low rate of filler material feed is desired, wire feed suffers from bead formation at the wire tip prior to the transfer of the filler material droplets to the object being welding. Moreover, use of powderized filler material in principle offers improved quality and productivity if the dosing and feed of the filler material can be arranged in a reliable manner. In the prior art, a torch with powderized material feed suited to manual welding has not been commercially available and the fabrication of a welding torch nozzle with a sufficiently small size down to microplasma welding has not been possible.

It is an object of the present invention to achieve a feed nozzle of filler material offering a smoothed velocity profile of the powderized filler material and accurate feed of the material into the plasma arc.

It is a further object of the invention to achieve a welding torch nozzle with a construction allowing simultaneous feed of both the shielding gas and the filler material to the object being welded via a common manifold of channels and thus keeping the dimensions of the nozzle tip so small that a powderized filler material can be employed in unusually tightly confined spaces.

In common with prior-art constructions, the transport system conveys the powderized material to the object being welded by gravity or with the help of a carrier gas.

The invention is based on routing the filler material flow initially along a first channel which is then branched into a manifold comprising at least two separate channels that are branched aside from the first channel.

The manifold of the branched channels can be further divided into a greater number of channels, and according to an advantageous embodiment of the invention, the plurality of the branched channels exit into a feed nozzle of the powderized material and the shielding gas, said nozzle being provided with a plurality of grooves that serve for guiding the shielding gas and the powderized material to the plasma arc of the torch and for laminarizing the gas flow.

More specifically, the nozzle assembly according to the invention is characterized by what is stated in the characterizing part of claim 1.

The invention offers significant benefits.

The nozzle construction achieves an extremely smooth filler material flow, whereby a consistently high quality of the weldment can be attained. The filler material is directed accurately into the arc exiting the nozzle, and a short distance can be maintained from the feed holes of the nozzle to the arc. As the nozzle performs smoothing of the particle velocity variations, an extremely small spreading of the powderized material jet results. The shielding gas flow pattern can be laminarized easily, whereby a good coverage of the molten pool is attained in all conditions. The present nozzle construction can be attached to the torch body thus replacing the conventional shielding gas dome or similar structure, and it can be designed for such a small size that permits its use in hand-held torches in very confined working spaces indeed. The nozzle can be fabricated through relatively simple manufacturing steps into an integrated part of the torch, or alternatively, as a separate detachable component, whereby the torch can also be operated without powderized material feed when equipped with a different type of nozzle. Obviously, a torch with an integral feed manifold of powderized material can be employed in conjunction with alternative filler materials if the powderized material feed is cut off. When the filler material is fed in powderized form, the welder can relieve the other hand from filler material feed, which significantly contributes to easement of work. The use of a powderized filler material achieves appreciably higher productivity and quality of weldment than is achievable with the use of filler material wire. The nozzle construction according to the invention permits the use of powderized filler material also in other positions than horizontal. Even overhead position welding becomes possible with powderized filler material when the nozzle construction according to the invention is used. By virtue of the above-described reasons, the productivity of plasma welding can be improved substantially with the help of the nozzle according to the present invention. The nozzle is cost-advantageous in manufacture and its elements can be made replaceable which simplifies the servicing of the nozzle.

In the following the invention is examined in greater detail with the help of the annexed drawings in which FIG. 1 shows the longitudinal section of a nozzle according to the invention.

FIGS. 2 . . . 5 show sections A—A, B—B, C—C and D—D of the embodiment illustrated in FIG. 1.

FIG. 6 shows an alternative embodiment of the invention.

FIGS. 7 . . . 10 show sections E—E, F—F, G—G and H—H of the embodiment illustrated in FIG. 6.

Figure 1:
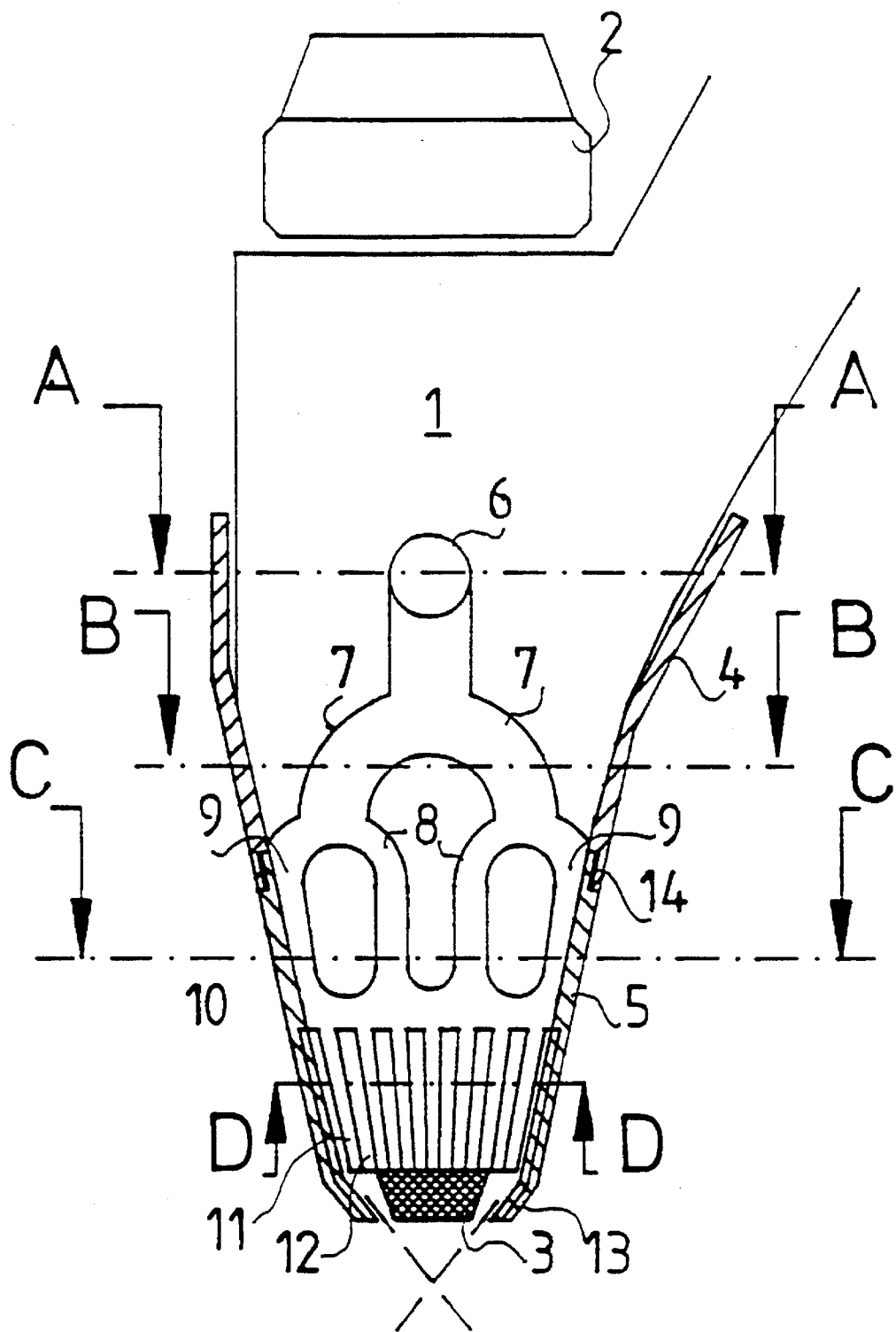
Figure 2:
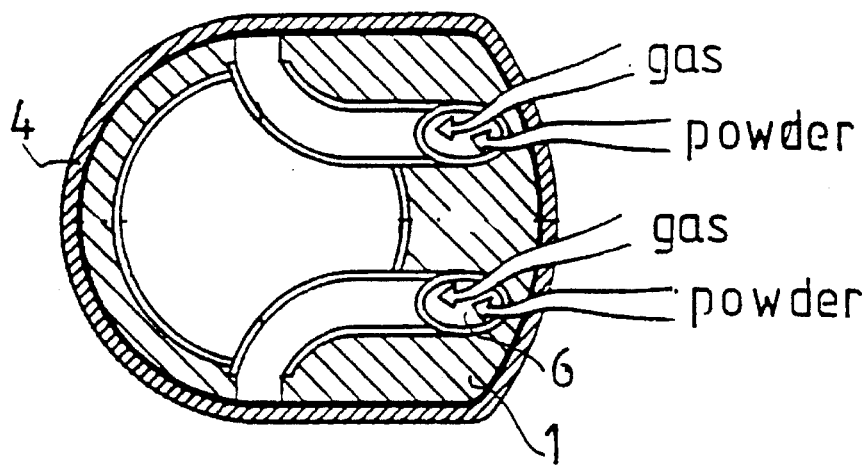
Figure 3:
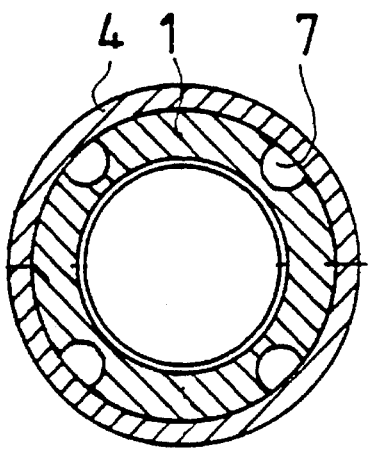
Figure 4:
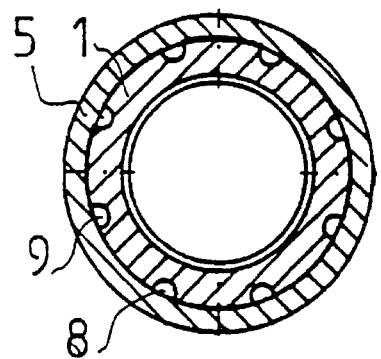
Figure 5:
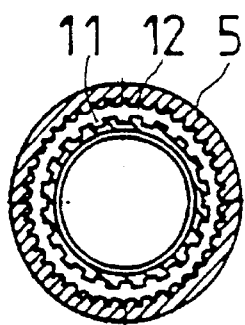

The feed assembly of powderized filler material according to the invention can be fabricated, e.g., for embodiments illustrated FIGS. 1 . . . 10 by casting or working the necessary channels into the torch body 1 made of an easy-to-machine plastic material. In FIGS. 1 . . . 10 the torch proper is illustrated diagrammatically to comprise a body part 1, a control knob 2 of the plasma arc electrode and a plasma nozzle piece 3. The feed manifold of the powderized filler material is formed by channels 6, 7, 8, 9 and 12 of the torch body part 1 and a two-part shell part 4, 5 which encloses the body part 1. The feed channel manifold 6, 7, 8, 9 is contoured onto the outer surface of the body part 1, whereby the channels are still open on this surface. The two-part shell 4, 5 adapted about the body part 1 delineates the open channels into closed flow channels. The upper shell part 4 can be designed as an integral part of the torch, while the lower shell part 5 can be detachable, whereby the shell parts 4, 5 are dividable along a seam 14. The fixing of the detachable shell part 5 can be arranged with the help of threading the parts or a joining sleeve. The fabrication material of the upper shell part can be selected freely, whereby the part can be made of plastic, for instance. The lower shell part is advantageously made of copper due to its high thermal conductivity, while also other materials of sufficient durability are also feasible.

The filler material feed to the handle part of the torch can be arranged along one or two feed lines. The actual feed manifold starts as two separate channels 6 which first run inside the torch body part 1, then diverting to the outer surface of the body part. where they are further divided into two branches 7. These first branches 7 are each next divided into further two branches 8, 9, thus forming eight feed branches symmetrically disposed on the outer surface of the torch body part. The branching points of the channels are rounded to improve steady flow of the filler material. These eight channels finally exit into an annular space 10 encircling the entire tip of the torch, said space further exiting into a purpose-designed nozzle part formed by the detachable shell part 5 as well as longitudinal grooves 11 and interposed ridges 12 on the lower body part 1 of the torch. The inner surface of the detachable nozzle shell part 5 can be provided with similar grooves and ridges or it can be smooth. In the embodiment illustrated in FIGS. 1 . . . 10, the inner surface of the detachable nozzle shell part 5 is grooved and the surfaces of the nozzle shell part 5 and the ridges of the body part 1 do not touch each other. The tip 13 of the nozzle shell part 5 tapers toward the center line of the nozzle tip, thus converging the shielding gas and the filler material flow so as to focus accurately about the plasma arc at a distance of approx. 5 mm from the tip of the plasma nozzle piece 3.

The powderized filler material enters the torch nozzle part along one, or as shown in FIGS. 1 . . . 10, two feed channels 6. These channels 6 are routed via the torch handle part to the filler material feed equipment that feeds the filler material to the nozzle conveyed by a carrier gas travelling at a high speed. As the feed distance of the filler material is relatively long, typically in the order of a few meters, the carrier gas flow speed must typically be in the order of approx. 20 m/s which requires efficient retardation of flow speed prior to the entry of the carrier gas with the conveyed powderized filler material into and about the plasma arc. At low volume rates, the carrier gas flowing at excessively high speeds cannot form a shielding envelope about the plasma arc, and moreover, the high velocity of the filler material particles easily throws them away from the intended landing site. According to the invention, the retardation of the carrier gas/filler material mixture is accomplished by diverting the flow direction of the mixture and increasing the cross section of the flow channels at the diverting points of the mixture flow. The carrier gas/filler material mixture reaches the nozzle tip part of the torch along feed channels 6 and then is divided into manifold branches 7, whereby the flow is branched aside and simultaneously meets a two-fold total cross section of the flow channels. The flow is diverted and divided a second time when proceeding from the first branches 7 to the second branches 8, 9. At this stage a sufficient degree of gas flow retardation has been attained.

The retarded flow must next be laminarized to attain smooth flow of the shielding gas and the filler material into the plasma arc. This is accomplished by guiding the flow from the second branches 8, 9 into an annular, contiguous space wherefrom it proceeds into a laminarization part of the nozzle in which grooves 11 and ridges 12 pointed toward the tip of the torch perform the laminarization of the flow profile. Finally, the flow is converged toward the working point with the help of the tip part 13 of the detachable shell part 5.

Figure 6:
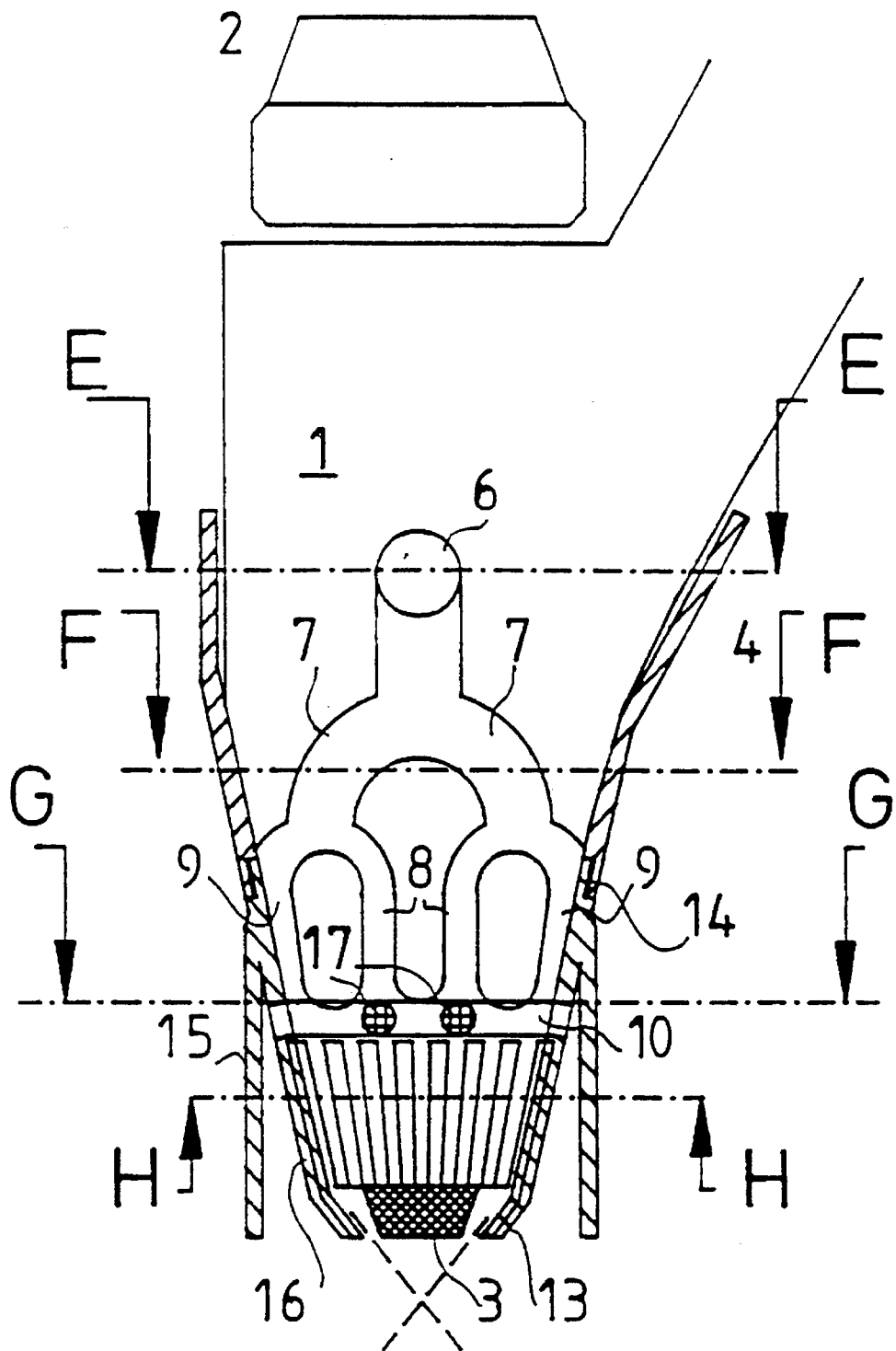
Figure 7:
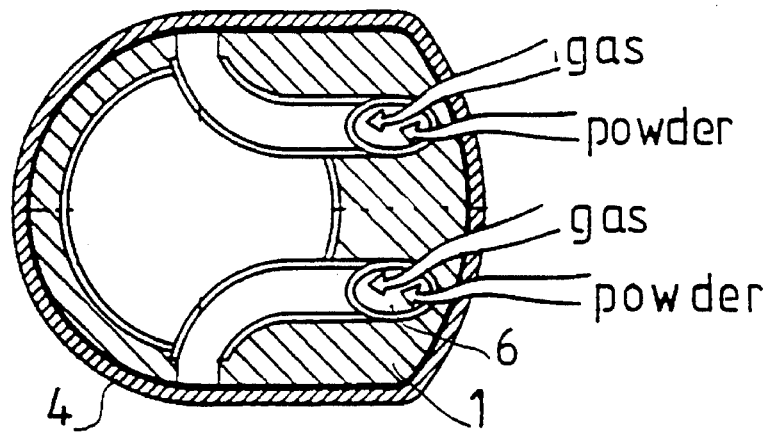
Figure 8:
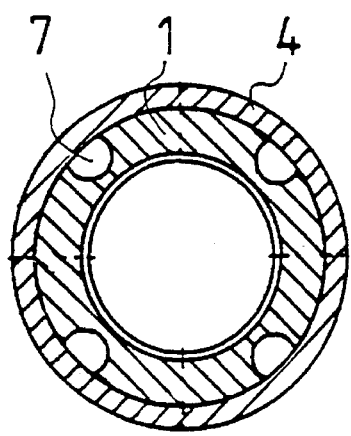
Figure 9:
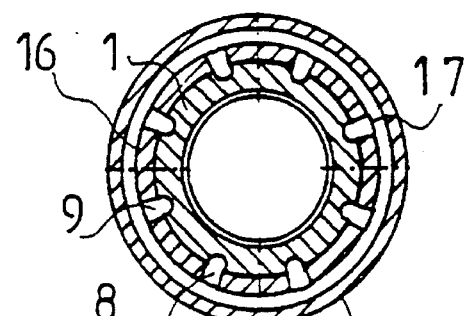
Figure 10:
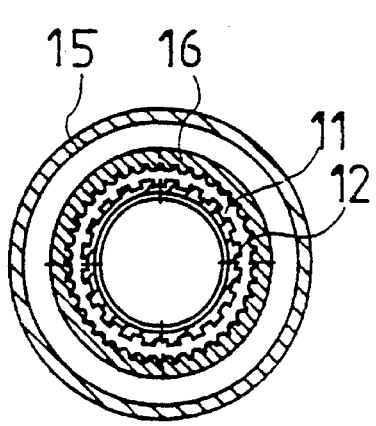

FIGS. 6 . . . 10 illustrate an alternative embodiment of the invention. In this embodiment the shielding gas and the filler material are separated from each other at the level of the annular space 10. Such an embodiment is suited to spray-coating and similar welding applications in which the area of the molten pool is large and the shielding gas must be guided to protect a wide area. Separation of the shielding gas from the gas flow is implemented by providing the detachable shell part with holes 17 covered with a micromesh screen. The pore size of the micromesh screen is typically in the order of 20 μm. Obviously, the mesh size can be varied, and preferably the mesh is in the range of 10 . . . 25 μm, while due to the oblique impinging of the filler material particles onto the screen, a mesh as large as 50 μm can still perform almost complete separation of the filler material particles from the conveying flow of shielding gas. The shell section is divided at the level of the holes 17 into an inner sleeve 16 acting as the laminarization nozzle envelope in the same manner as in the above-described embodiment, and into a bell-shaped skirt 15 surrounding the inner sleeve. When the shielding gas/filler material mixture enters the annular space 10, the shielding gas diffuses via the holes covered by the mesh screen into the space delineated by the inner sleeve 16 and the skirt 15, wherefrom the skirt 15 directs the shielding gas to surround the molten pool. The filler material itself is routed via the laminarization part of the nozzle to the plasma arc. Otherwise this embodiment is not different from that illustrated in FIGS. 1 . . . 5.

Figure 11:
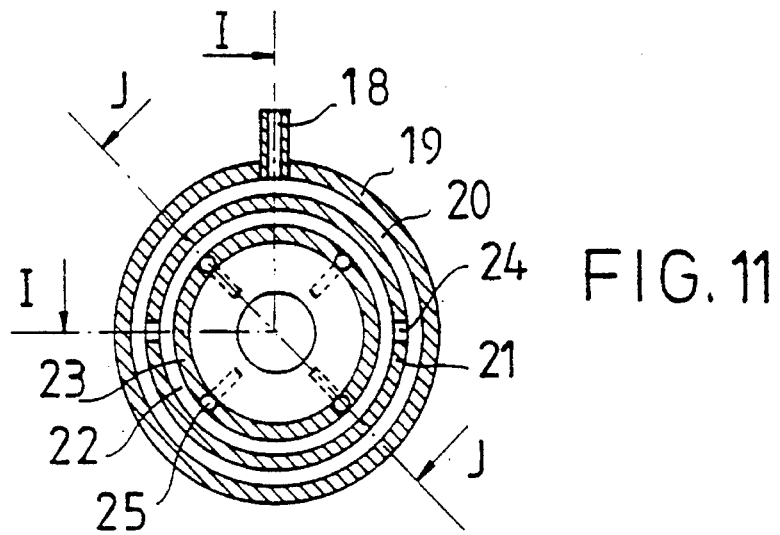
FIG. 11 shows another alternative embodiment of the invention.
Figure 12:
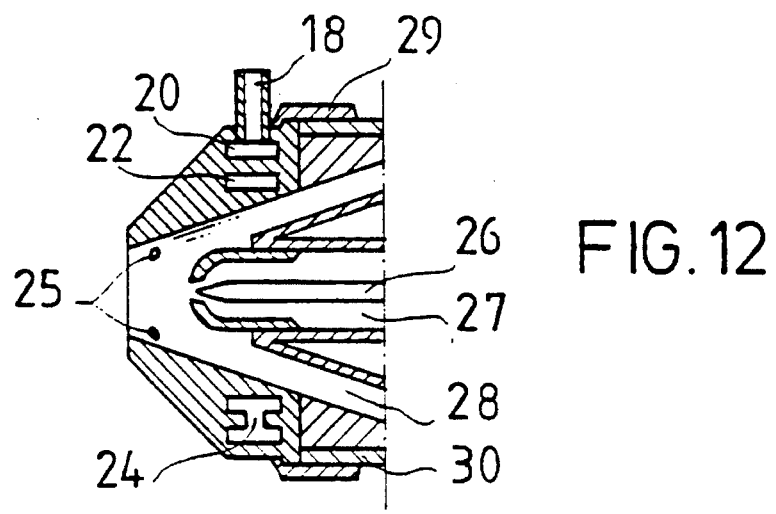
FIG. 12 shows section I—I of the embodiment illustrated in FIG. 11.
Figure 13:
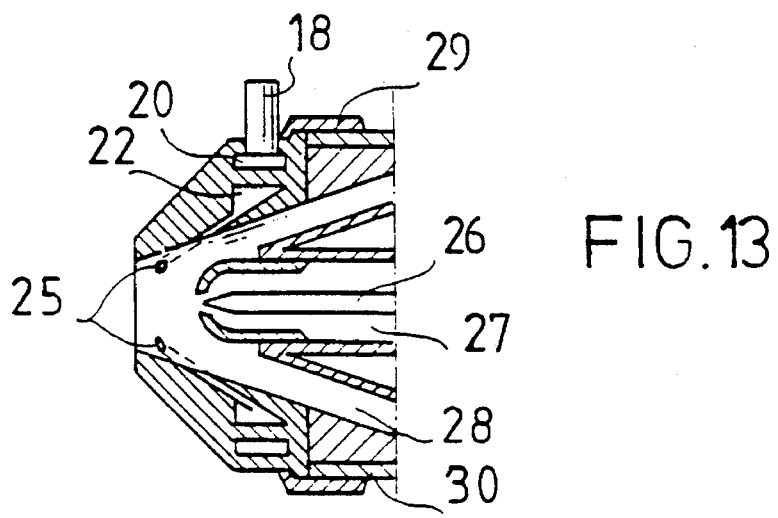
FIG. 13 shows section J—J of the diagram of FIG. 11.

FIGS. 11 . . . 13 illustrate a nozzle construction according to the invention suited fabrication into a separate, detachable part of the torch. The detachable nozzle is comprised of annular, coaxial chambers 20 and 22 delineated by walls 19, 21 and 23. The outer wall 19 is provided with an inlet connection 18 of the filler material flow that exits into a first chamber 20. An interchamber wall 21 separates the first chamber 20 and the second chamber 22 from each other, whereby said wall is provided with two holes 24 exiting into the second chamber 22. The holes made to the interchamber wall 21 are circumferentially shifted by 90° within the nozzle from the inlet connection 18 of the powderized filler material. The tapered cylindrical inner wall 23 forms a shielding gas chamber about the plasma arc and is further provided with four holes 25 which exit the second chamber 22 pointing obliquely downstream toward the tip of the nozzle. The holes 25 in the inner wall 23 are circumferentially shifted by 45° from the holes 24 in the interchamber wall 21.

The powderized filler material is fed along with the shielding gas flow via an inlet connection 18 to the first chamber 20 where the material flow is divided into two branches and allowed to enter the second chamber 22 via holes 24 provided in the interchamber wall 21. In the second chamber 22 the once-divided material flow is again divided and allowed to enter the plasma-arc chamber via holes 25 in the inner wall 23. In each dividing stage, the material flow speed is reduced and flow speed variations are smoothed out as the flow is branched abruptly aside both when entering a chamber via an entry hole, whereby the flow hits the chamber wall, and when diverted into the adjacent exit hole. This operating principle of the nozzle construction is thus analogous to an exhaust muffler.

The nozzle is attached with the help of a threaded sleeve 29 to the plasma torch body part 30. Then, the nozzle forms a shielding gas bell that delineates a chamber 28 for guiding the shielding gas flow. The center of the torch nozzle forms a plasma gas chamber 27 with a center electrode 26. Injection holes 25 made to the inner wall 23 of the plasma gas chamber exit close to the excited plasma arc, and by virtue of the downstream and radially inward alignment of the holes 25 relative to the plasma arc, the flow of the filler material particles meet the plasma arc accurately and homogeneously. The distribution of the powderized material flow pattern is further smoothed by the tact that the injection holes 25 in the inner wall 23 that form the last portion of the feed channels are extremely short in length. This prevents any speed pulsing reoccurring in the filler material flow that is smoothed in the chambers 20 and 22.

The nozzle illustrated in FIGS. 11 . . . 13 is advantageously made from copper by brazing, thus ensuring improved heat removal from the nozzle. High thermal conductivity is crucial for the operation of the nozzle, since the filler material tends to accumulate onto the nozzle if the temperature of the filler material is allowed to rise above 200° C. Obviously, the material and dimensioning of the nozzle piece can be varied. The location of the holes in the nozzle can be slightly varied from the oblique angles illustrated in conjunction with the above embodiments provided that the distances between the inlet and outlet holes in each chamber are kept sufficiently large. In principle the number of the holes can be increased, although little benefit would be gained over the described numbering scheme 1-2-4. The direction of the injection holes 25 in the inner wall 23 can be varied, while they are advantageously aligned to exit obliquely downstream relative to the plasma arc. The cone tapering angle of the inner wall 23 in the nozzle construction can be varied, and in special cases, even a straight-walled inner part of the nozzle can be employed. In addition to the use in a plasma torch as described in the above embodiment, the nozzle construction is advantageously suited to laser welding.

In all above-described embodiments the feed channel manifold can be employed for feeding the filler material alone. Obviously, in such applications the torch must be provided with separate channels for the gas. Furthermore, the filler material and the shielding gas can be brought to the torch along different lines and then mixed first in the torch.

We claim:

1. An assembly for feeding, in addition to other materials, a powderized filler material in a welding torch comprising:

a body part having an interior and a first tip section;

elements contained within the interior of the body part, suited to establish a welding flame;

a nozzle piece enclosing the welding flame at the first tip section; said nozzle piece having a second tip section;

at least one inlet channel for conveying the filler material to the second tip section, said at least one inlet channel having a flow area;

nozzle elements for directing a filler material flow into the welding flame at the second tip section;

said body part defining a space arranged in fluid communication with the nozzle elements, said nozzle elements being located between said space and said second tip section so that the nozzle elements form an exit from said space towards the second tip section; and at least two first branches forked from the end of said inlet channel, said at least two first branches having a first combined flow area which is greater that said flow area of said at least one inlet channel, said at least two first branches being suited to divide and retard the filler material flow and divert its flow direction and guide the flow to said space arranged in fluid communication with the nozzle elements.

2. An assembly as defined in claim 1, further comprising at least two second branches forked from the end of each of said first branches and having a second combined flow area which is greater than said first combined flow area of said at least two first branches, said at least two second branches forked from the end of each of said first branches being suited to diverting and retarding the filler material flow in a second stage prior to guiding the flow to said nozzle elements.

3. An assembly as defined in claim 2, wherein the number of said inlet channels is two and said channels are located symmetrically on both sides of the body part of the torch.

4. An assembly as defined in claim 3, wherein at least the first and second branches are defined by grooves which are formed on the outer surface of the body part of the torch and then closed off by a shell enclosing said body part.

5. An assembly as defined in claim 4, wherein said shell includes first and second parts, said first part enclosing said nozzle elements and being detachable.

6. An assembly as defined in claim 3, further comprising ridges formed to the tip of the body part of the torch, suited to act as a flow-laminarizing section in the nozzle elements.

7. An assembly as defined in claim 6, wherein at least the first and second branches are defined by grooves which are formed on the outer surface of the body part of the torch and then closed off by a shell enclosing said body part.

8. An assembly as defined in claim 7, wherein said shell includes first and second parts, said first part enclosing said nozzle elements and being detachable.

9. An assembly as defined in claim 2, wherein said space arranged in connection with the nozzle elements is annular.

10. An assembly as defined in claim 9, said annular space having a wall, with at least one hole in said wall, said hole being covered with a screen for separating the shielding gas from the filler material stream.

11. An assembly as defined in claim 9, wherein at least the first and second branches are defined by grooves which are formed on the outer surface of the body part of the torch and then closed off by a shell enclosing said body part.

12. An assembly as defined in claim 11, wherein said shell includes first and second parts, said first part enclosing said nozzle elements and being detachable.

13. An assembly as defined in claim 9, further comprising ridges formed to the tip of the body part of the torch, suited to act as a flow-laminarizing section in the nozzle elements.

14. An assembly as defined in claim 13, wherein at least the first and second branches are defined by grooves which are formed on the outer surface of the body part of the torch and then closed off by a shell enclosing said body part.

15. An assembly as defined in claim 14, wherein said shell includes first and second parts, said first part enclosing said nozzle elements and being detachable.

16. An assembly as defined in claim 2, further comprising ridges formed to the tip of the body part of the torch, suited to act as a flow-laminarizing section in the nozzle elements.

17. An assembly as defined in claim 16, wherein at least the first and second branches are defined by grooves which are formed on the outer surface of the body part of the torch and then closed off by a shell enclosing said body part.

18. An assembly as defined in claim 17, wherein said shell includes first and second parts, said first part enclosing said nozzle elements and being detachable.

19. An assembly as defined in claim 2, wherein at least the first and second branches are defined by grooves which are formed on the outer surface of the body part of the torch and then closed off by a shell enclosing said body part.

20. An assembly as defined in claim 19, wherein said shell includes first and second parts, said first part enclosing said nozzle elements and being detachable.

21. An assembly as defined in claim 1, wherein the number of said inlet channels is two and said channels are located symmetrically on both sides of the body part of the torch.

22. An assembly as defined in claim 21, wherein at least the first and second branches are defined by grooves which are formed on the outer surface of the body part of the torch and then closed off by a shell enclosing said body part.

23. An assembly as defined in claim 22, wherein said shell includes first and second parts, said first part enclosing said nozzle elements and being detachable.

24. An assembly as defined in claim 21, further comprising ridges formed to the tip of the body part of the torch, suited to act as a flow-laminarizing section in the nozzle elements.

25. An assembly as defined in claim 24, wherein at least the first and second branches are defined by grooves which are formed on the outer surface of the body part of the torch and then closed off by a shell enclosing said body part.

26. An assembly as defined in claim 25, wherein said shell includes first and second parts, said first part enclosing said nozzle elements and being detachable.

27. An assembly as defined in claim 1, further comprising ridges formed to the tip of the body part of the torch, suited to act as a flow-laminarizing section in the nozzle elements.

28. An assembly as defined in claim 27, wherein at least the first and second branches are defined by grooves which are formed on the outer surface of the body part of the torch and then closed off by a shell enclosing said body part.

29. An assembly as defined in claim 28, wherein said shell includes first and second parts, said first part enclosing said nozzle elements and being detachable.

30. An assembly as defined in claim 1, wherein at least the first and second branches are defined by grooves which are formed on the outer surface of the body part of the torch and then closed off by a shell enclosing said body part.

31. An assembly as defined in claim 30, wherein said shell includes first and second parts, said first part enclosing said nozzle elements and being detachable.

32. An assembly as defined in claim 1, said assembly having an inner wall that at least partially encloses the welding flame; further comprising:
   a first annular chamber having a powderized material feed connection in fluid communication with it;
   a second annular chamber, adapted coaxially to the interior of said first chamber;
   an interchamber wall between said first and said second chamber, said wall having holes circumferentially shifted at a distance from said powderized material feed connection; and
   an inner wall of the second, inner chamber, said wall having at least four injection holes, said holes being shifted within the nozzle circumferentially at a distance from the holes in said interchamber wall, and said holes in said inner wall exiting at the inner perimeter of the inner wall.

33. An assembly as defined in claim 32, further comprising elements suited for detachably mounting the assembly to the first tip section.

* * * * *